July 28, 1959  L. FOULLETIER ET AL  2,897,064
CATALYTIC OVENS
Filed May 14, 1956
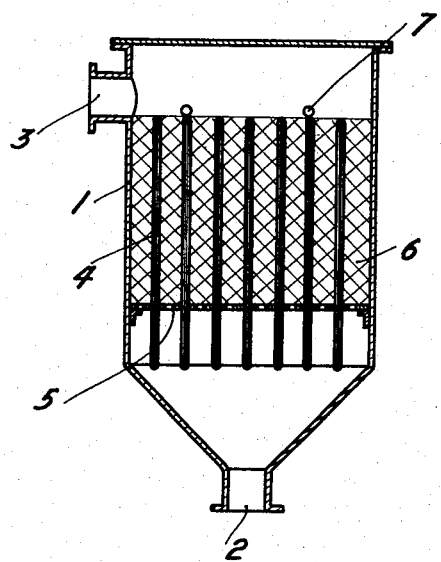

United States Patent Office

2,897,064
CATALYTIC OVENS

Louis Foulletier and Robert Dassaud, Lyon, France, assignors to Société d'Electro-Chimie d'Electro-Metallurgie et des Acieries Electrique d'Ugine, Paris, France, a corporation of France Application May 14, 1956, Serial No. 584,618

Claims priority, application France May 27, 1955

1 Claim. (Cl. 23—288)

The present invention relates to improvements in catalytic ovens, in particular in those ovens used in the manufacture of fluoro-chloro-methanes by the action of hydrofluoric acid on chloro-methanes, the said improvements being especially intended to avoid local over-heating of the mass of the catalyst and to facilitate its replacement.

In the industrial application of exothermic catalytic reactions, especially of those which are carried out in the gaseous phase, it is often difficult to maintain at all points of the catalytic mass the temperature which is the most appropriate to the reaction. It is in fact almost inevitable that there will exist zones of high temperature in which the catalyst is subjected to a kind of ignition caused by a super-activity which modifies the process of the reaction. For this reason, in the manufacture of fluoro-chloro-methanes, there is produced, in addition to a thermal unbalance, a formation of products which are too strongly fluorinated, which often represent a loss of material. In addition, the production of zones of high temperature unfavorably affects the duration of catalyst activity.

Various methods have been proposed to overcome these drawbacks. For example, it is possible to reduce the quantity of one of the reagents introduced into the furnace; in that case, however, the efficiency of the reaction is reduced at the same time, without however succeeding in obtaining the desired optimum temperatures in the various parts of the catalyst. Normally the reaction is incomplete and a portion of the products thus obtained has to be re-cycled. For example, when in the case of the manufacture of di-chloro-di-fluoro-methane, the reactor is supplied with an insufficient quantity of hydrofluoric acid, the content of tri-fluoro-chloro-methane is inadequately reduced, and the products delivered contain a high proportion of fluoro-tri-chloro-methane and of tetrachloride of carbon which has not been converted.

Another method of overcoming the above difficulties consists in diluting the reaction gases, for example by re-cycling to the input of the reactor a part of the products delivered. Although this expedient results in a more regular reaction, it is of no advantage since it gives rise to complication of the equipment and a reduction in the capacity of the ovens. In the case of fluorination, it makes it necessary, furthermore, to convey hot gases containing hydrochloric acid and, in some cases, hydrofluoric acid, which are highly corrosive.

In order to avoid local over-heating in these exothermic reactions, it has also been proposed to construct the reactor in the form of nests of tubes, the zone of catalysis being either inside or outside the tube, which are surrounded or filled by a circulating fluid, the function of which is to keep the temperature uniform. The construction of such a reactor is complicated and this constitutes a serious drawback when the reaction medium is highly corrosive to certain metals, which is especially the case in the manufacture of fluoro-chloro-methane. In addition, the emptying and filling of the catalyst are made difficult by the multi-tubular form of the oven. Finally, when the temperature of the reaction is high, for example in the manufacture of fluoro-chloro-methanes, in which it is between 300 and 500° C., a fluid must be employed which will withstand this temperature. In general, such a fluid is gaseous and this gives rise to the further disadvantage of a bad coefficient of heat transfer between the gaseous fluid and the walls of the tubes.

The present invention has for its object improvements in known catalysis ovens, these improvements consisting essentially in arranging in the interior of the oven and parallel to the direction of flow of the reaction fluid, rods of a conducting material, which are preferably uniformly distributed throughout the mass of the catalyst.

These rods may have any appropriate section, for example polygonal, circular or star-shaped; they may be graphite or a metal such as, for example, steel, aluminium or copper, or two different metals, for example copper covered with steel by drawing or in any other way, in order to protect the copper from corrosion.

The rods may be fixed on the supporting plate of the catalyst, which enables the whole unit to be easily withdrawn in order to replace the catalyst. They may be placed in position in any other suitable manner, for example they may be fixed to the walls of the oven by another means and simply pass through the supporting plate of the catalyst; the catalyst may then be replaced by sliding back the bottom of the oven and then the supporting plate of he catalyst, thus causing the catalyst to fall out. It may be of advantage to extend the rods beyond the zone filled with catalyst towards the zone of entry of the fluid, a gaseous mixture for example, in order to provide pre-heating of the said mixture.

It is remarkable that in a general way and especially in the manufacture of fluoro-chloro-methanes, the use of a reactor of this kind enables the exchanges of heat with the exterior to be limited, apart from losses by radiation, to the calories carried off by the fluid which passes out at a temperature higher than its entry temperature. It has been found that the arrangement in conformity with the present invention makes the temperature uniform within the interior of the mass of the catalyst, avoiding the formation of over-heated zones and in consequence assisting the main reaction. These results are confirmed by the almost total absence, at the outlet of the reactor, of too-highly fluorinated products, and by a reduction of products which are insufficiently fluorinated.

The attached drawing represents a form of construction of an oven provided with the improvements in accordance with the present invention.

In this drawing, the oven is constituted by a casing 1 of sheet steel with an inlet 2 and an outlet 3 for the products. In the interior of the oven are mounted parallel rods 4 which are welded to the perforated plate 5 supporting the catalyst 6. The perforated plate 5 rests on brackets in such a manner that the whole unit formed by the rods 4, the plate 5 and the catalyst 6 may be withdrawn upwards all at once by means of rings 7 provided at the upper extremities of some of the rods 4.

The remarkable effectiveness of the device in accordance with the invention is clearly shown by the following comparison which relates to the manufacture of fluoro-chloro-methanes by the action of hydrofluoric acid on chloro-methanes such as tetrachloride of carbon and chloroform: it is known that this reaction, which is preferably carried out in the gaseous phase in the presence of a catalyst, is strongly exothermic and that the catalyst employed have most frequently bad coefficients of thermal conductivity.

The reaction of catalytic fluorination was first of all carried out in a cylindrical oven of 300 mm. in internal diameter, containing 25 litres of catalyst. The catalysis temperature (the temperature of the axis of the oven at the mid-height of the catalyst) was in the vicinity of 410° C. Tetrachloride of carbon and hydrofluoric acid were introduced in a molar ratio of 1 to 1.7 with a view to the manufacture of di-fluoro-di-chloro-methane. It was not possible to obtain a constant temperature, in spite of the constant variations which were carried out on the inlet temperature of the gaseous mixture. By trying in this way to eliminate the zones of over-heating by reducing the temperature of the gases at the inlet, the point was reached at which the reaction ceased and at which the temperature of the whole of the mass of catalyst fell below the reaction temperature.

The composition of the gases discharged, after elimination of hydrochloric acid, is shown in column A of the table given below.

The reaction of fluorination was then carried out in the same oven which had been provided with 30 rods of mild steel of 20 mm. in diameter spaced apart by 40 mm. between centers. The oven was supplied with the same primary materials as previously indicated. The temperature was very easy to stabilize at the optimum temperature of fluorination for the production of di-fluoro-di-chloro-methane; a relatively large variation of the inlet temperature of the gases into the oven had no influence on the operation of catalysis. The composition of the gases delivered is shown in B of the table given below. It can be seen that the selectivity is very greatly improved and that the disappearance of the too-fluorinated products increases the efficiency in raw materials.

| Products obtained | A | B |
|---|---|---|
| | Percent | Percent |
| Tetrachloride of carbon | 7.5 | 8 |
| Flouro-tri-chloro-methane | 29.5 | 15.5 |
| Di-flouro-di-chloro-methane | 50 | 76 |
| Tri-flouro-chloro-methane | 13 | 0.5 |

What we claim is:

A fixed bed catalytic reaction oven for the fluorination of chloromethane comprising a substantially vertical reaction chamber, a gas inlet opening in the lower part of said chamber, a gas outlet opening in the upper part of said chamber, a perforated supporting plate removably positioned in said chamber, a mass of catalyst supported by said plate, a plurality of substantially vertical solid rods of a thermally-conducting material fixed to said supporting plate and substantially uniformly spaced throughout said mass of catalyst, said solid rods projecting under said mass of catalyst and through the supporting plate toward said gas inlet opening, thereby preheating the gas entering said inlet opening before it reaches the catalytic mass, said rods being located within said catalyst mass to conduct heat from one part of the mass to a second part of the mass to equalize the temperature throughout the mass, and a removable cover on said chamber to permit easy removal of said plate, said mass of catalyst particles and said solid rods.

References Cited in the file of this patent

UNITED STATES PATENTS

| | | |
|---|---|---|
| 1,873,876 | Downs | Aug. 23, 1932 |
| 2,376,356 | Harrison | May 22, 1945 |
| 2,492,788 | Dennis | Dec. 27, 1949 |
| 2,744,147 | Milks | May 1, 1956 |
| 2,744,148 | Ruh et al. | May 1, 1956 |
| 2,745,722 | Lacoste | May 15, 1956 |
| 2,745,886 | Ruh et al. | May 15, 1956 |
| 2,748,177 | Miller et al. | May 29, 1956 |
| 2,768,882 | Mattson | Oct. 30, 1956 |

FOREIGN PATENTS

| | | |
|---|---|---|
| 594,733 | Great Britain | Nov. 18, 1947 |